United States Patent
Iliev et al.

(10) Patent No.: US 9,449,004 B2
(45) Date of Patent: Sep. 20, 2016

(54) FILE REPOSITORY ABSTRACTION LAYER

(75) Inventors: Ivaylo Iliev, Sofia (BG); Vencislav Dimitrov, Pernik (BG); Galin Galchev, Sofia (BG); Georgi Stanev, Sofia (BG)

(73) Assignee: SAP SE, Walldorf (DE)

( * ) Notice: Subject to any disclaimer, the term of this patent is extended or adjusted under 35 U.S.C. 154(b) by 644 days.

(21) Appl. No.: 13/421,588

(22) Filed: Mar. 15, 2012

(65) Prior Publication Data
US 2013/0246458 A1 Sep. 19, 2013

(51) Int. Cl.
G06F 7/00 (2006.01)
G06F 17/00 (2006.01)
G06F 17/30 (2006.01)

(52) U.S. Cl.
CPC ... *G06F 17/30091* (2013.01); *G06F 17/30197* (2013.01)

(58) Field of Classification Search
USPC ............... 707/3, 100, 711; 705/27; 715/769; 709/203
See application file for complete search history.

(56) References Cited

U.S. PATENT DOCUMENTS

| | | | |
|---|---|---|---|
| 2002/0156702 A1* | 10/2002 | Kane | 705/27 |
| 2009/0248707 A1* | 10/2009 | Mehta et al. | 707/100 |
| 2009/0327250 A1* | 12/2009 | Green et al. | 707/3 |
| 2011/0078603 A1* | 3/2011 | Koomullil | 715/769 |
| 2011/0125727 A1* | 5/2011 | Zou et al. | 707/711 |
| 2011/0246444 A1* | 10/2011 | Jenkins et al. | 707/711 |
| 2013/0036156 A1* | 2/2013 | Todorova et al. | 709/203 |

OTHER PUBLICATIONS

"Apache Subversion", Wikipedia, [online], Retrieved from the Internet: <URL: http://en.wikipedia.org/w/index.php?title=Apache_Subversion&printable=yes>, (Accessed Feb. 23, 2012), 11 pgs.
"Representational state transfer", Wikipedia, [Online], Retrieved from the Internet: <URL: http://en.wikipedia.org/w/index.php?title=Representational_state_transfer&printable=yes>, (Accessed on Feb. 23, 2012), 9 pgs.
"Subversion Cheat Sheet", Abbey Workshop, [Online}, Retrieved from the Internet: <URL: http://www.abbeyworkshop.com/howto/misc/svn01/>, (Accessed Mar. 2, 2012), 6 pgs.

* cited by examiner

*Primary Examiner* — Susan Chen
(74) *Attorney, Agent, or Firm* — Schwegman Lundberg & Woessner, P.A.

(57) ABSTRACT

Example systems and methods of implementing an abstraction layer for a file repository are presented. In one example, an access request to retrieve an electronic file is received from a requesting device. The request includes an identification of a first storage location in the file repository. In response to the request, the first storage location of the file repository is searched for the electronic file. If the search is successful, the electronic file is retrieved from the file repository at the first storage location. If the search is unsuccessful, a redirection file is accessed in the file repository. The redirection file includes an identification of a second storage location for the electronic, file at a storage site external to the file repository. The electronic file is retrieved from the storage site based on the indication of the second storage location. The retrieved file is transmitted to the requesting device.

17 Claims, 8 Drawing Sheets

FILE REPOSITORY ABSTRACTION LAYER

BACKGROUND

To provide cloud-based software solutions, such as "software-as-a-service" (SaaS) applications, to multiple customers via a communication network such as the Internet, one or more server systems may be capable of executing multiple applications in response to customer requests. To enable each server access to a consistent set of applications, these applications may be deployed to an electronic file repository accessible by the servers. In most situations, the file repository includes all of the executable binary files, configuration files, and the like that are necessary for executing the applications of interest on the servers. For example, Java® class files, configuration files, and so on may be retrieved from a file repository, deployed on a server, and made available to client systems as a software-as-a-service.

In some implementations, the file repository may facilitate server access to the files located therein by way of a standard hierarchically-organized file system, with files, file folders, and so on. In other examples, the file repository may provide access by way of a version control system (VCS), which may facilitate the selection and use of multiple versions of the same software, thus allowing customers to employ a particular version that is not necessarily the newest version available. In one example, such capability may be important if a newer software version is discovered to create problems not ordinarily experienced during execution of older versions.

Typically, the file repository facilitates access only to files within that file repository, which may include one or more software databases. As a result, other files not located in the repository that may be useful for the execution of a particular application arc not generally available through the repository. In other examples, repositories at one or more server sites may each provide essentially the same binary files and configuration files to provide the same set of applications to customers located at geographically diverse locations, thus likely resulting in duplicate copies of the same files throughout multiple server sites of the same service provider.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

At least some of the embodiments described herein provide various techniques for implementing an abstraction layer for an electronic file repository. Generally, a file repository is a centralized facility that stores and provides access to multiple electronic files. In the examples discussed below, the file repository may store electronic files associated with one or more software applications, such as executable binary files, configuration files, and the like. However, repositories for storing other types of electronic files, such as application source files, data files, document files, and so on, may benefit from the various techniques discussed herein.

In one example, the file repository abstraction layer may process file access requests in a manner that allows files residing at storage sites external to the file repository to be accessed via the repository, thus simplifying access to files that may be stored at more than one location, Allowing such centralized access may also result in overall reduced storage requirements. In another implementation, the file repository abstraction layer may operate in multiple modes, thus facilitating access to the files by multiple types of users or clients. Other aspects of the embodiments discussed herein may be ascertained from the following detailed description.

Figure 1:
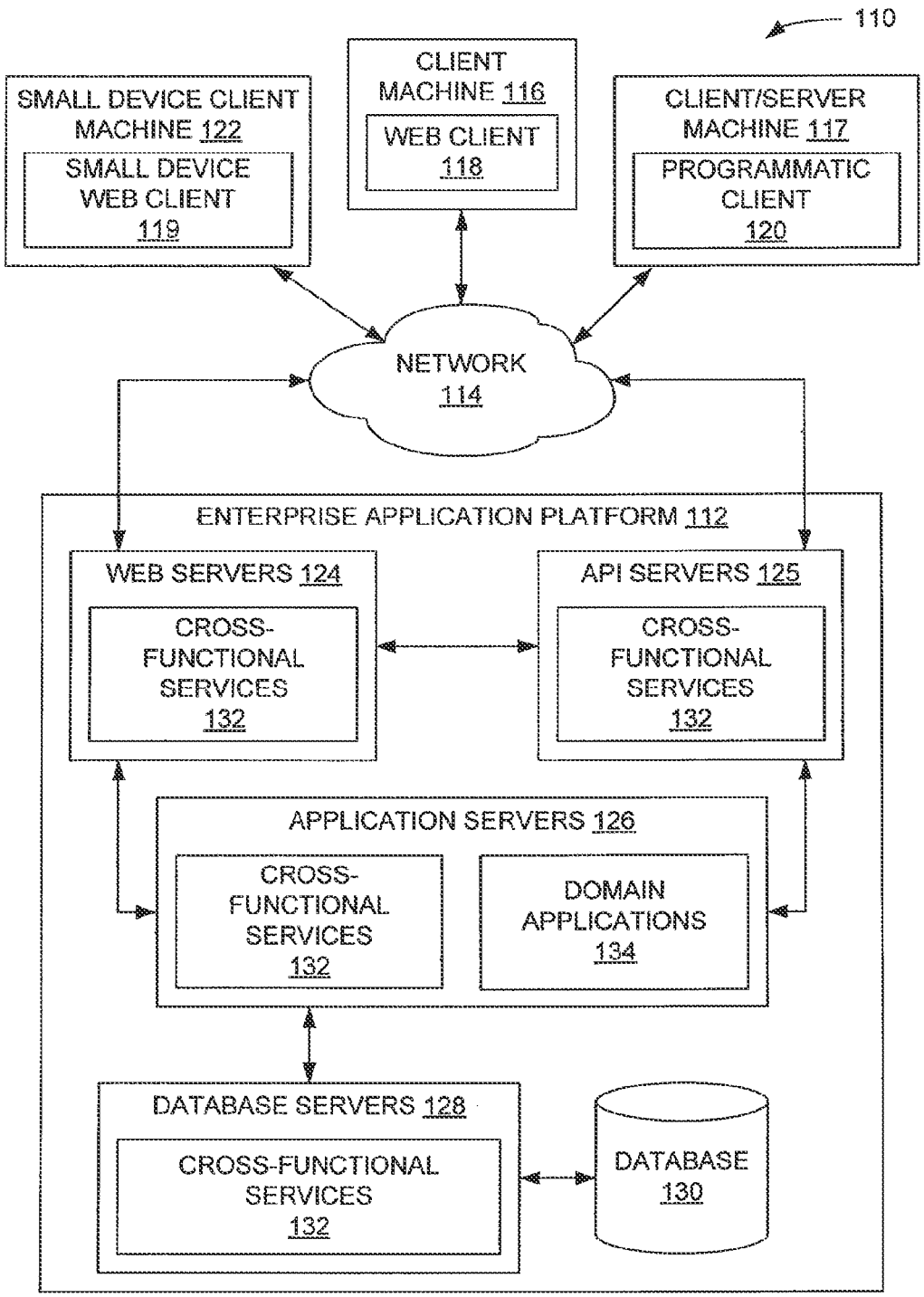
FIG. 1 is a block diagram of an example system having a client server architecture for an enterprise application platform capable of employing the systems and methods described herein.

FIG. 1 is a network diagram depicting an example system 110, according to one exemplary embodiment, having a client-server architecture configured to perform the various methods described herein. A platform (e.g., machines and software), in the exemplary form of an enterprise application platform 112, provides server-side functionality via a network 114 (e.g., the Internet) to one or more clients. FIG. 1 illustrates, for example, a client machine 116 with a web client 118 (e.g., a browser, such as the Internet Explorer® browser developed by Microsoft Corporation), a small device client machine 122 with a small device web client 119 (e.g., a browser without a script engine), and a client/server machine 117 with a programmatic client 120.

Turning specifically to the enterprise application platform 112, web servers 124 and application program interface servers 125 are coupled to, and provide web and programmatic interfaces to, application servers 126. The application servers 126 are, in turn, shown to be coupled to one or more database servers 128 that may facilitate access to one or more databases 130. The web servers 124, application program interface servers 125, application servers 126, and database servers 128 may host cross-functional services 132. The application servers 126 may further host domain applications 134.

The cross-functional services 132 may provide user services and processes that utilize the enterprise application platform 112. For example, the cross-functional services 132 may provide portal services (e.g., web services), database services, and connectivity to the domain applications 134 for users that operate the client machine 116, the client/server machine 117, and the small device client machine 122. In addition, the cross-functional services 132 may provide an environment for delivering enhancements to existing applications and for integrating third party and legacy applications with existing cross-functional services 132 and domain applications 134. Further, while the system 110 shown in FIG. 1 employs a client-server architecture, the present disclosure is, of course, not limited to such an architecture, and could equally well find application in a distributed or peer-to-peer architecture system.

Figure 2:
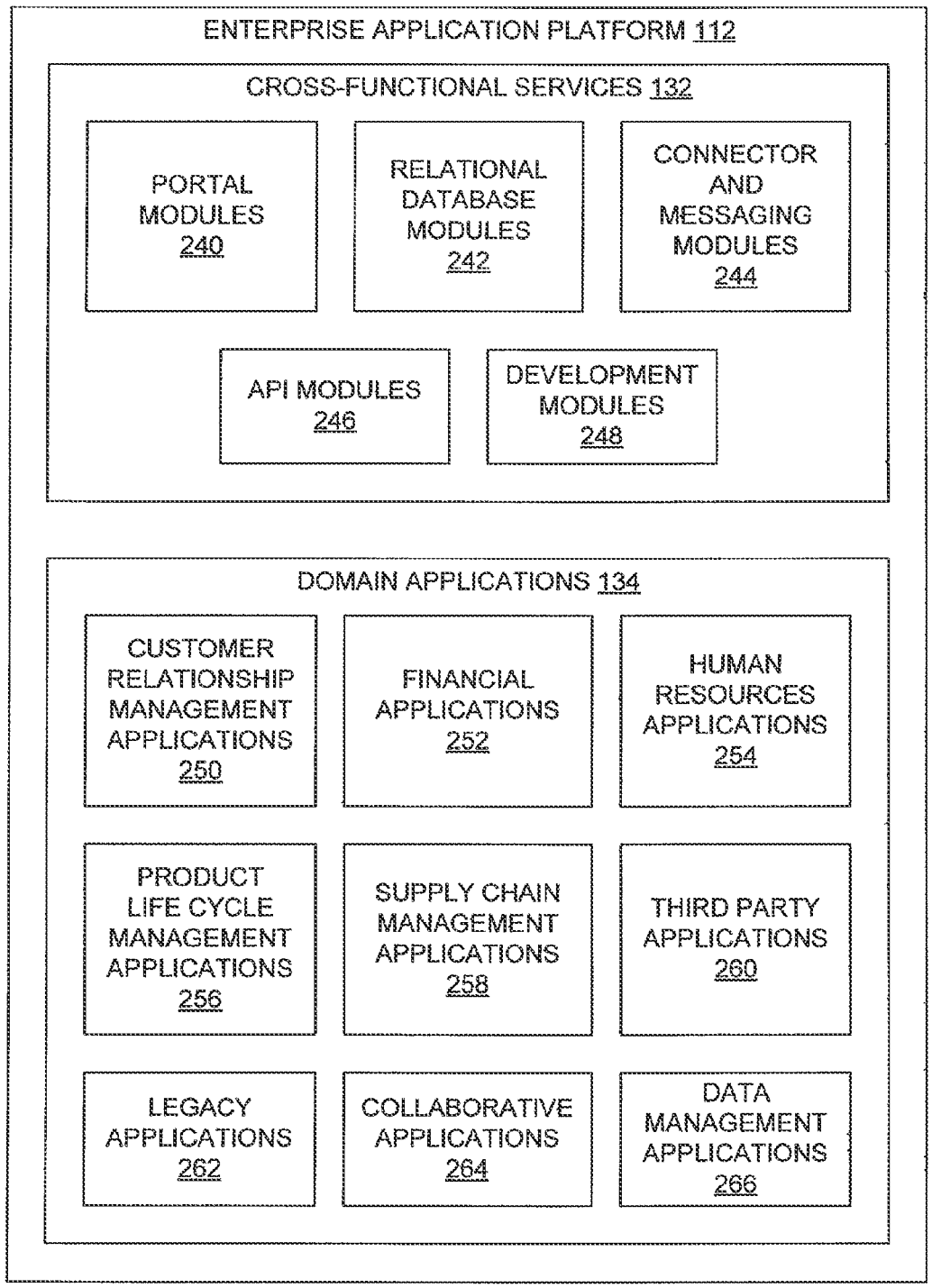
FIG. 2 is a block diagram of example applications and modules employable in the enterprise application platform of FIG. 1.

FIG. 2 is a block diagram illustrating example enterprise applications and services, such as those described herein, as embodied in the enterprise application platform 112, according to an exemplary embodiment. The enterprise application platform 112 includes cross-functional services 132 and domain applications 134. The cross-functional services 132 include portal modules 240, relational database modules 242, connector and messaging modules 244, application program interface (API) modules 246, and development modules 248.

The portal modules 240 may enable a single point of access to other cross-functional services 132 and domain applications 134 for the client machine 116, the small device client machine 122, and the client/server machine 117 of FIG. 1. The portal modules 240 may be utilized to process, author, and maintain web pages that present content (e.g., user interface elements and navigational controls) to the user. In addition, the portal modules 240 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 240 may include, in one implementation, a generation module, a communication module, a receiving module, and a regenerating module. In addition, the portal modules 240 may comply with web services standards and/or utilize a variety of Internet technologies, including, hut not limited to, Java®, J2EE, SAP's Advanced Business Application Programming (ABAP®) Language and Web Dynpro, XML, JCA, JAAS, X.509, LDAP, WSDL, WSRR, SOAP, UDDI, and Microsoft .NET.

The relational database modules 242 may provide support services for access to the database 130 (FIG. 1) that includes a user interface library. The relational database modules 242 may provide support for object relational mapping, database independence, and distributed computing. The relational database modules 242 may be utilized to add, delete, update, and manage database elements. In addition, the relational database modules 242 may comply with database standards and/or utilize a variety of database technologies including, but not limited to, SQL, SQLDBC, Oracle, MySQL, Unicode, and JDBC.

The connector and messaging modules 244 may enable communication across different types of messaging systems that are utilized by the cross-functional services 132 and the domain applications 134 by providing a common messaging application processing interface. The connector and messaging modules 244 may enable asynchronous communication on the enterprise application platform 112.

The application program interface (API) modules 246 may enable the development of service-based applications by exposing an interface to existing and new applications as services. Repositories may be included platform 112 as a central place to find available services when building applications.

The development modules 248 may provide a development environment for the addition, integration, updating, and extension of software components on the enterprise application platform 112 without impacting existing cross-functional services 132 and domain applications 134.

Turning to the domain applications 134, customer relationship management applications 250 may enable access to, and facilitate collecting and storing of relevant personalized information from multiple data sources and business processes. Enterprise personnel that are tasked with developing a buyer into a long-term customer may utilize the customer relationship management applications 250 to provide assistance to the buyer throughout a customer engagement cycle.

Enterprise personnel may utilize financial applications 252 and business processes to track and control financial transactions within the enterprise application platform 112. The financial applications 252 may facilitate the execution of operational, analytical, and collaborative tasks that are associated with financial management. Specifically, the financial applications 252 may enable the performance of tasks related to financial accountability, planning, forecasting, and managing the cost of finance.

Human resources applications 254 may be utilized by enterprise personnel and business processes to manage, deploy, and track enterprise personnel. Specifically, the human resources applications 254 may enable the analysis of human resource issues and facilitate human resource decisions based on real-time information.

Product life cycle management applications 256 may enable the management of a product throughout the life cycle of the product. For example, the product life cycle management applications 256 may enable collaborative engineering, custom product development, project management, asset management, and quality management among business partners.

Supply chain management applications 258 may enable monitoring of performances that are observed in supply chains. The supply chain management applications 258 may facilitate adherence to production plans and on-time delivery of products and services.

Third-party applications 260, as well as legacy applications 262, may be integrated with domain applications 134 and utilize cross-functional services 132 on the enterprise application platform 112.

Additionally, collaborative applications 264 may facilitate joint creation and modification of documents and other work product by multiple users, and data management applications 266 may enable data organization and other management functions to be performed on data generated by one or more other domain applications 134.

Figure 3:
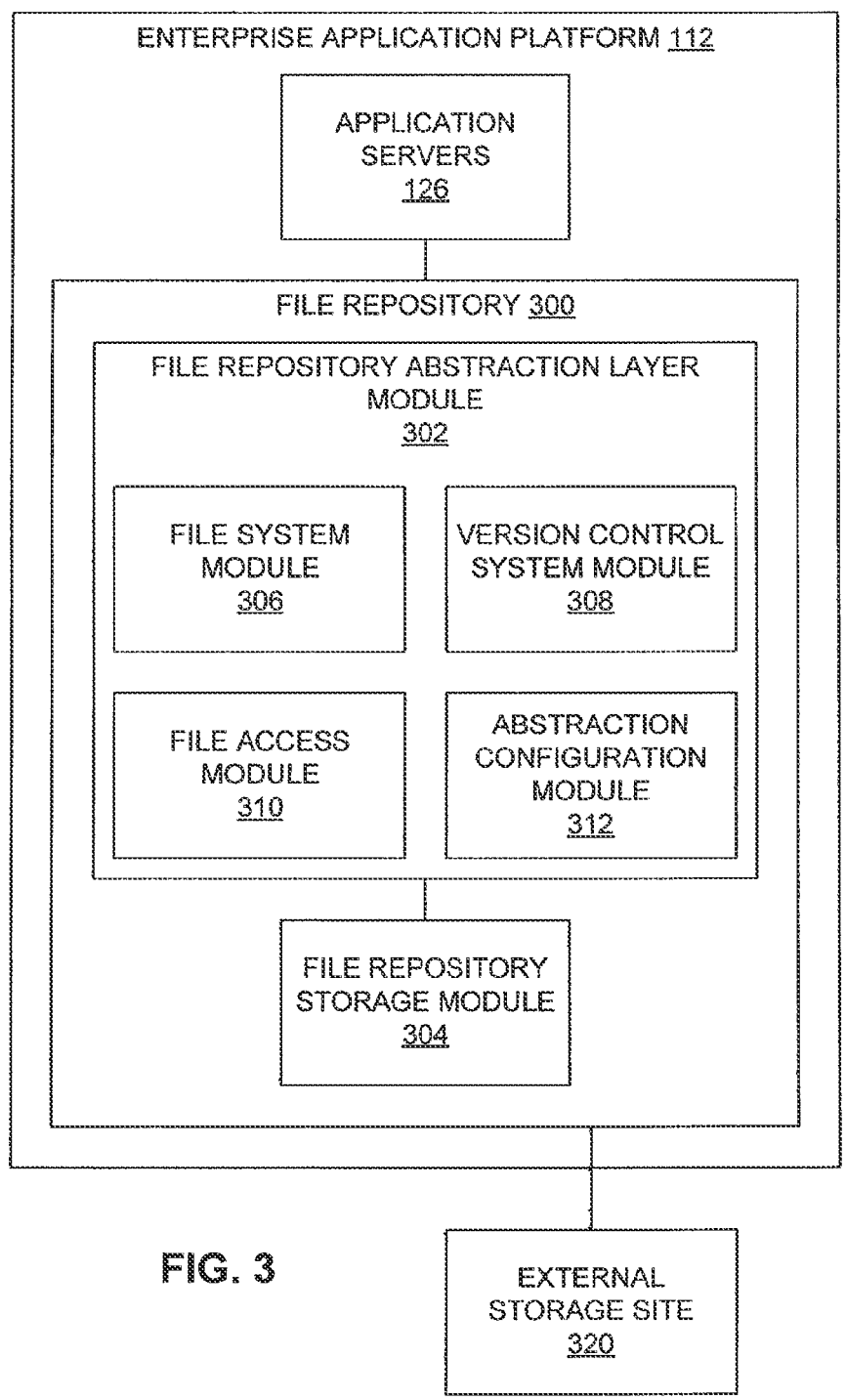
FIG. 3 is a block diagram of example modules utilized in the enterprise application platform of FIG. 1 for systems and methods of implementing an abstraction layer for a file repository.

FIG. 3 is a block diagram of example modules employable in the enterprise application platform 112 of FIG. 1 for systems and methods of implementing an abstraction layer for a file repository. In the example of FIG. 3, the enterprise application platform 112 includes the application servers 126 (FIG. 1) coupled to a file repository 300. The file repository 300 includes a file repository abstraction layer module 302 coupled with a file repository storage module 304. The file repository abstraction layer module 302 may further include, for example, a file system module 306, a version control system module 308, a file access module 310, and an abstraction configuration module 312. Coupled with the file repository 300, external to the enterprise application platform 112, may be an external storage site 320. In some implementations, one or more of these modules may be incorporated in other modules of the enterprise application platform 112. For example, the file repository 300 may be one of the cross-functional services 132 (FIG. 2) stored in or among the application servers 126 or database servers 128 of the enterprise application platform 112, or as a portion of the database 130 (FIG. 1) located therein. In other examples, various modules of the file repository 300 may be distributed across one or more modules or locations of the enterprise application platform 112. In some embodiments, the enterprise application platform 112 and the file repository 300 may be employed in a software-as-a-service (SaaS) platform, a software platform dedicated to a particular entity, or in another software execution environment.

In yet other implementations, the file repository 300 may not be employed with an enterprise application platform 112, but may instead be located and used in, or coupled with, any other computing system configured to utilize a file repository. Further, any of the modules 302 through 310 may be combined into fewer modules, or may be partitioned into a greater number of modules. In addition, while the embodiments discussed herein presume the use of the client-server architecture of the system 110 of FIG. 1, the file repository 300 may be employed in a peer-to-peer arrangement, or even within a single computing system.

In FIG. 3, the file repository storage module 304 may provide the digital data storage for multiple files or similar electronic items to be accessed by the application servers 126. in other examples, other modules or systems, such as the client machines 116, 117, and 122 of FIG. 1, may access the file repository 300 and the file repository storage module 304 via the network 114. The file repository storage module 304 may include or have access to one or more data storage devices or systems, such as magnetic or optical disk drives, solid state disk (SSD) systems, and the like, to store the various files. In the examples described below, the file repository storage module 304 employs a hierarchical data storage structure that may include one or more electronic file folders, each of which may contain electronic files and other file folders, which in turn, may contain other files and folders. Such a structure may continue virtually indefinitely. Examples of similar file structures may be found in several computer operating systems, such as Windows® by Microsoft Corporation, Mac OS® by Apple Inc., Linux®, UNIX®, and so on.

The file repository abstraction layer module 302 may operate as an abstraction layer for the file repository storage module 304. As mentioned above, the file repository abstraction layer module 302 may operate in multiple operating modes, thus allowing the electronic files of the file repository storage module 304 to be accessed via any of the operating modes. In the example of FIG. 3, the file repository abstraction layer module 302 may be operated in one of two operating modes: a file system mode and a version control system (VCS) mode. As a result, the file system module 306 may interpret file access requests from the application servers 126 when the file repository abstraction layer module 302 is operating in a file system mode, and the version control system module 308 may interpret the file access requests when the file repository abstraction layer module 302 operates in a version control system mode. In one example, the file system module 306 may process access requests, such as the writing, reading and deleting of files typically encountered in a file system, such as that provided by Windows®, UNIX®, Linux®, and other operating systems. In another example, the version control system module 308 may process access requests, such as checkout, add, commit, move, and so on, that are normally employed in version control systems, such as, for example, the open source version control system Subversion® (SVN®).

While the file repository abstraction layer module 302 may employ two different operating modes in the example of FIG. 3, other embodiments may employ any number of operating modes, thus facilitating access to the file repository storage module 304 in a variety of ways, each of which may be appropriate for a particular user, system, or client.

Figure 5:
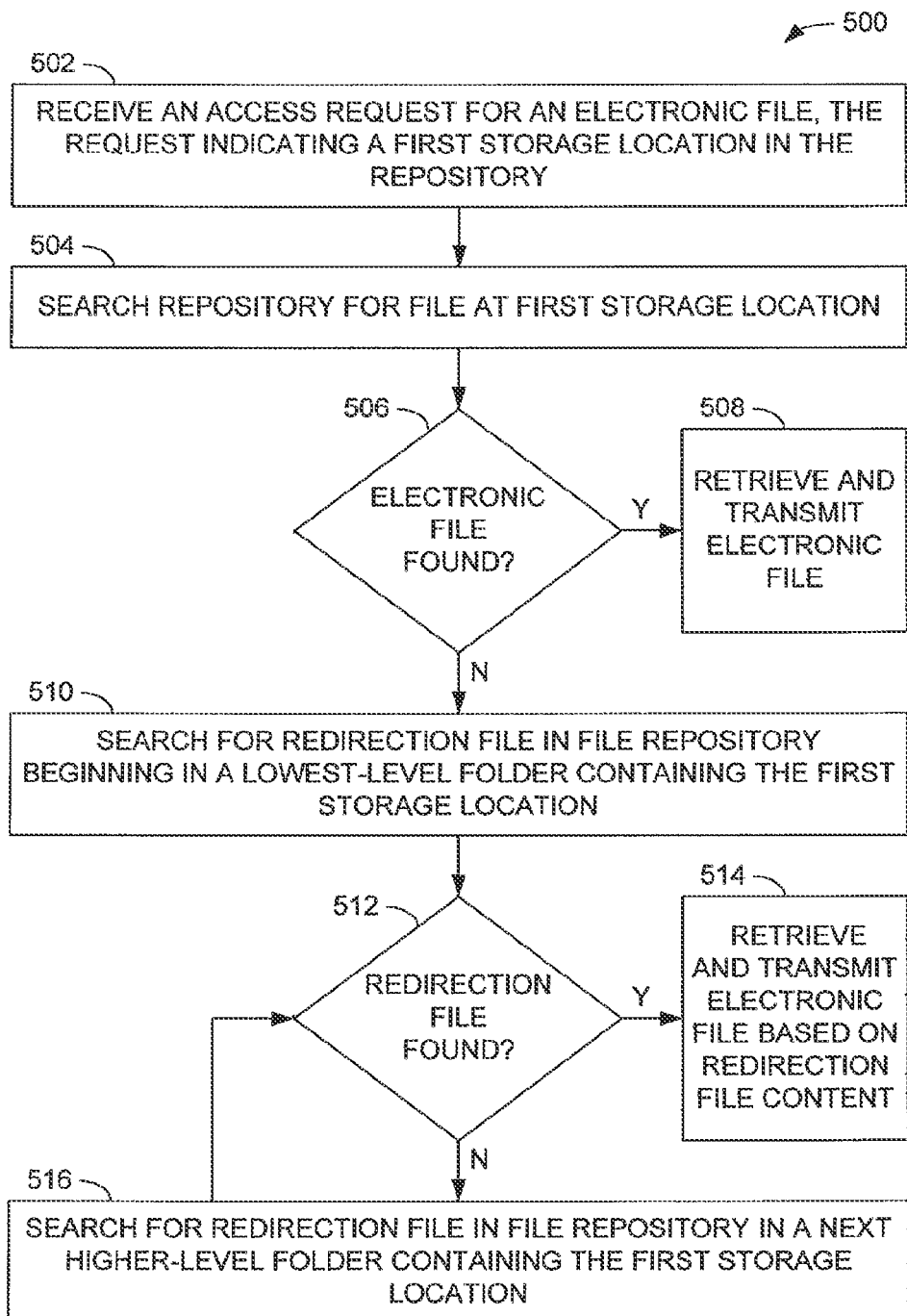
FIG. 5 is a flow diagram illustrating an example method of fulfilling a file access request in which the requested file may be in the file repository or an external storage site.
Figure 6:
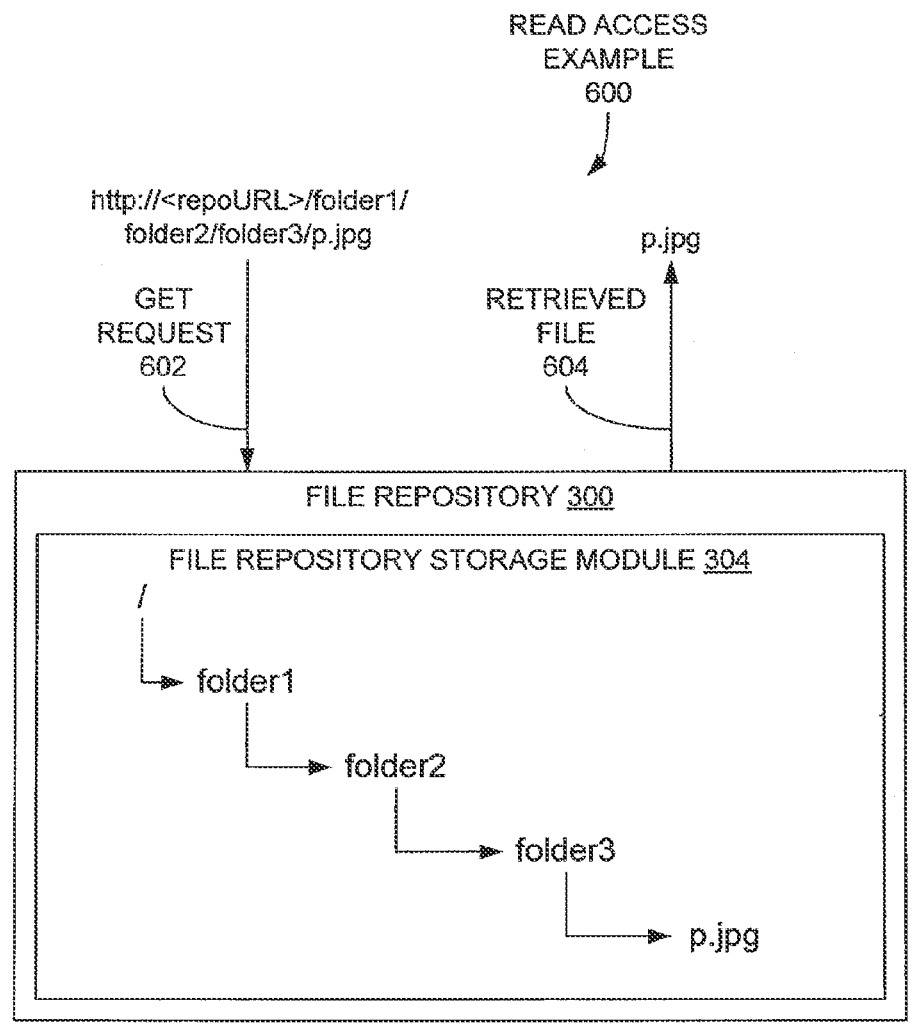
FIG. 6 is a block diagram illustrating an example file access in which the requested file is located in the file repository.
Figure 7:
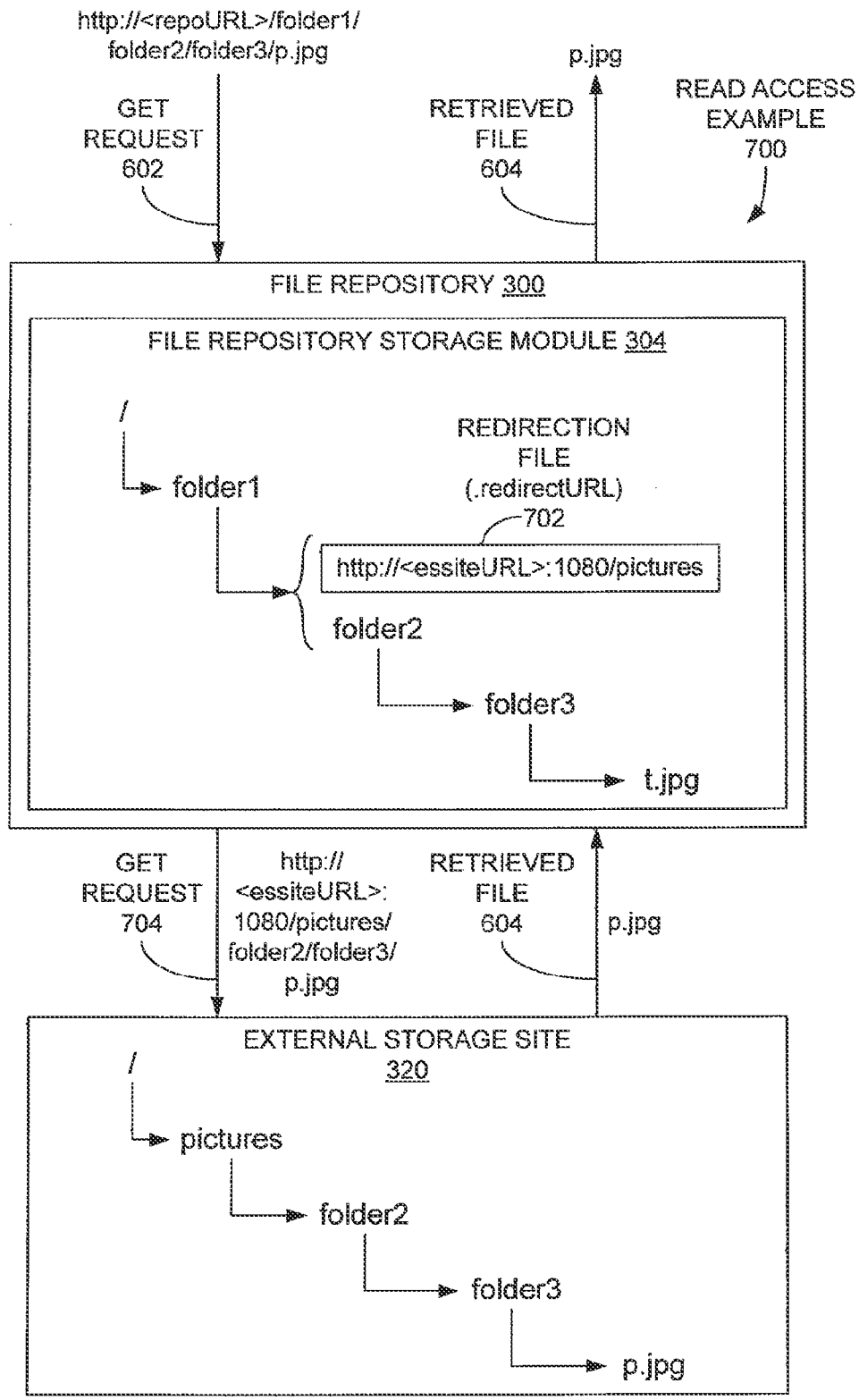
FIG. 7 is a block diagram illustrating an example file access in which the requested file is not located in the file repository.

The file access module 310 of FIG. 3 may perform file access operations based on the file access requests that are interpreted by either or both of the file system module 306 and the version control system module 308. Such file access operations may include, but are not limited to, the creation, writing, reading, and updating of files, file folders, and the like, as stored via the file repository storage module 304. In some embodiments, the file access module 310 may also facilitate the redirection of file access requests targeted at the file repository storage module 304 to the external storage site 320. FIGS. 5-7, discussed below, provide examples of such functionality.

Also depicted in FIG. 3, the abstraction configuration module 312 stores and maintains configuration data for directing the operation of the file repository abstraction layer module 302. For example, the abstraction configuration module 312 may store operating mode configuration data indicating the current operating mode (e.g., file system versus version control system) of the file repository abstraction layer module 302. The abstraction configuration module 312 may further provide other configuration data, such as data that determines how file access requests may be redirected from the file repository storage module 304 to the external storage site 320.

The external storage site 320 may provide storage for electronic files and file folders outside the file repository storage module 304 while remaining accessible via the file repository abstraction layer module 302. The external storage site 320 may be embodied as any type of storage device, system, database, or the like capable of storing the files and file folders of interest. While only one external storage site 320 is exhibited in FIG. 3, any number of external storage sites 320 located internal and/or external to the enterprise application platform 112 may exist in other implementations.

Figure 4:
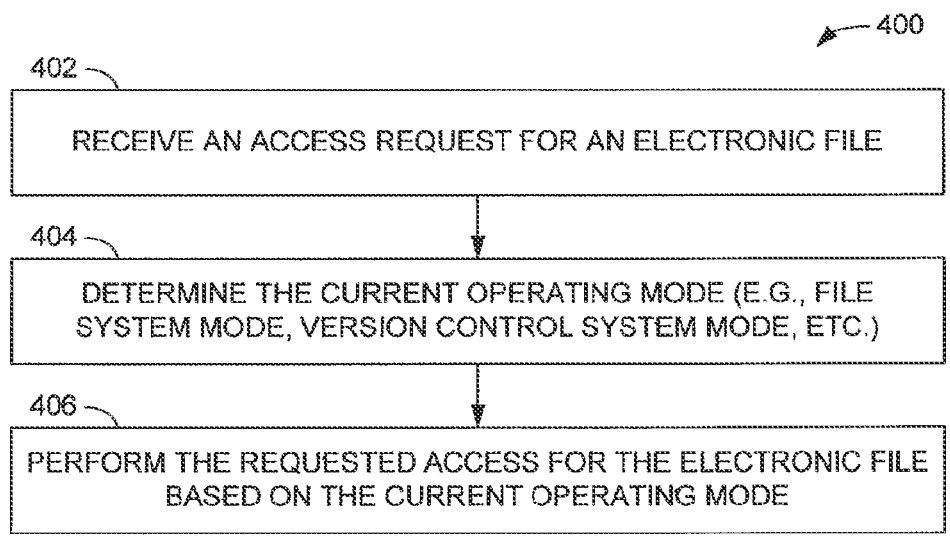
FIG. 4 is a flow diagram of an example method of processing a file access request for a file repository according to a current operating mode of a file repository abstraction layer.

FIG. 4 is a flow diagram illustrating an example method 400 of processing a file access request for a file repository (such as the file repository 300 of FIG. 3) according to a current operating mode of a file repository abstraction layer (such as the file repository abstraction layer module 302 of FIG. 3), in the method 400, the file repository abstraction layer module 302 receives an access request for an electronic file (operation 402). In one example, the request may be in the form of a web access request, such as a HyperText Transfer Protocol (HTTP) request, although other types of requests may be used in other communication networks or systems. Also, a current operating mode for the file repository abstraction layer module 302 is determined (operation 404). As indicated above, the file repository abstraction layer module 302 may consult the abstraction configuration module 312 to make the determination as to the current operating mode (e.g., the file system mode or the version control system mode). The requested access for the electronic file is then performed based on the current operating mode (operation 406). In the example of FIG. 3, the module corresponding to the current operating mode (e.g., the file system module 306 or the version control system module 308), in conjunction with the file access module 310, performs the requested access operation in light of the current operating mode of the file repository abstraction layer module 302.

While the operations 402 through 406 of the method 400 of FIG. 4 are shown in a specific order, other orders of operation, including possibly concurrent execution of at least portions of one or more operations, may be possible in some implementations of method 400, as well as other methods discussed herein. For example, the determination of the current operating mode (operation 404) may occur before, or concurrently with, the receiving of the access request (operation 402).

FIG. 5 is a flow diagram illustrating an example method 500 of fulfilling a file access request in which the requested file may be in a file repository (e.g., the file repository 300 of FIG. 3) or an external storage site (e.g., the external storage site 320 of FIG. 3). In this particular example, the requested file access is a read operation of the electronic file. However, requests for other types of file access, such as write or update requests, may be performed in a similar manner. Moreover, the method 500 may apply to any operating mode of the file repository abstraction layer module 302 (FIG. 3). In the method 500, an access request for an electronic file is received at the file repository abstraction layer module 302 (operation 502). The request indicates a first storage location in the file repository 300 or, more specifically, in the file repository storage module 304 (FIG. 3). The file access module 310 (FIG. 3) may then search the repository storage module 304 for the file at the first storage location (operation 504). If the electronic file is found at the first storage location (operation 506), the electronic file is retrieved from the first storage location in the file repository storage module 304 and transmitted to the source of the file access request (operation 508).

If, instead, the electronic file to be accessed is not found in the first storage location in the file repository storage module 304 (operation 506), the file access module 310 (FIG. 3) may attempt to access a "redirection file" in the file repository storage module 304 (operation 510). The redirection file may provide at least some information as to the actual location of the requested electronic file in an external storage site, such as the external storage site 320 of FIG. 3. The redirection file may contain an address, location, or path, such as a web address or uniform resource locator (URL) of the electronic file. In the example method 500 of FIG. 5, file access module 310 may search for the redirection file beginning at a lowest-level file folder containing the first storage location. For instance, if the first storage location is http://<repository>/folder1/folder2/file, the file access module 310 may begin searching for the redirection file at http://<repository>/folder1/folder2.

If the redirection file is found in the searched folder (operation 512), the file access module 310 (FIG. 3) may then retrieve the electronic file based on the content of the redirection file and transmit the retrieved electronic file to the source of the file access request (operation 514). If the redirection file is not found in the searched folder (operation 512), the file access module 310 may then search for the redirection file in the next higher-level folder containing the first storage location (operation 516). Continuing with the example provided above, presuming the redirection file was not located in http://<repository>/folder1/folder2, the file access module 310 may then search for the redirection file at the next higher-level folder, at http://<repository>/folder1. This process may then proceed until the redirection file is found in the file repository storage module 304 (FIG. 3).

In addition to the content of the redirection file, the actual location of the electronic file to be accessed also may be based on the original (first) storage location, the location of the redirection file in the file repository storage module 304 (FIG. 3), or both. The example of FIG. 7 provides a more specific example in which the contents of the redirection file, the location of the redirection file in the file repository storage module 304, and the first storage location all determine the location of the electronic file of interest.

FIG. 6 is a block diagram illustrating an example 600 of a file read access in which the requested file is located in the file repository 300 or, more specifically, in the file repository storage module 304. In this example and the example of FIG. 7, file access requests are in the form of HTTP requests, specifically HTTP GET requests to read an electronic file from the file repository 300. However, in other embodiments, other types of requests, such as write, update, checkout, delete, and so on, may employ one or more aspects of the examples discussed below. In further examples, other communication protocols other than HTTP may be utilized for file access requests and responses.

FIG. 6 depicts a particular logical file structure in the file repository storage module 304 in which a Joint Photographic Experts Group (JPEG) file p.jpg is stored within a file folder folder3. In turn, folder3 is logically located within folder2, which resides within folder1. Likewise, folder1 logically resides within a root folder "/".

In the example 600 of FIG. 6, the file repository 300 receives an HTTP GET request 602 with a path description of the form http://<repoURL>/folder1/folder2/folder3/p.jpg. The portion <repoURL> of the path is a URL for the repository 300. As indicated above, such an access may occur from an application server 126 (FIG. 1) or another device or system within the enterprise application platform 112 (also FIG. 1), or from some device or system external to the enterprise application platform 112, such as a client machine 116, 117, and 122 (FIG. 1).

In response to receiving the request 602, the file repository 300, via the file access module 310 (FIG. 3), attempts to retrieve the requested file p.jpg from the storage location indicated in the request 602. As the file is located in the expected location in the logical file structure of the file repository storage module 304, the file access module 310 may retrieve the file p.jpg from the file repository storage module 304 and transmit p.jpg as a retrieved file 604 to the source of the request 602.

FIG. 7 is a block diagram illustrating an example file read access 700 in which the requested file p.jpg is not located in the file repository 300 or, more specifically, in the file repository storage module 304. As illustrated in FIG. 7, the file repository storage module 304 provides the same three nested folders (folder1, folder2, and folder3) as shown in FIG. 6. However, folder3 of FIG. 7 does not contain the requested file p.jpg, but instead may include other files not relevant to the request 602, such as t.jpg. As a result, in response to the received GET request 602 of http://<repoURL>/folder1/folder2/folder3/p.jpg, the file access module 310 (FIG. 3) unsuccessfully attempts to retrieve the requested file from the file repository storage module 304 at the storage location or path indicated in the request 602.

At that point, the file access module 310 (FIG. 3) may attempt to access a redirection file 702. In one example, the redirection file 702 possesses a standardized filename, which in the case of FIG. 7 is .redirectURL. In other examples, other filenames for the redirection file 702 may be used, and such filenames may only have to follow some predefined naming convention to allow the file access module 310 to recognize a redirection file 702. In some examples, more than one redirection file 702 may be present within the file repository storage module 304 so that multiple files and/or file folders from different portions of the logical file structure may be redirected to other storage sites external to the file repository 300.

Responsive to the file access module 310 (FIG. 3) not finding the requested file in the storage location indicated in the request 602 (i.e., http://<repoURL>/folder1/folder2/folder3/p.jpg), the file access module 310 may search the same folder specified in the path indicated in the request 602 for the redirection file 702. In the example of FIG. 7, the file access module 310 may thus first attempt to retrieve the redirection file 702 at http://<repoURL>/folder1/folder2/folder3/.redirectionURL. As the redirection file 702 is not located in folder3 in this example, the file access module 310 may then proceed to search for the redirection file 702 at the next higher-level folder (i.e. folder2) as indicated in the path provided in the request 602 (i.e., http://<repoURL>/folder1/folder2/.redirectionURL). Having not succeeding in locating the redirection file 702 at that location, the file access module 310 may then continue to the next higher-level folder (i.e., folder1) to search for the redirection file 702 at http://<repoURL>/folder1/.redirectionURL. At this location in the file repository storage module 304, the file access module 310 finds the redirection file 702 (.redirectURL).

The redirection file 702 may include a URL pointing to a location at which the request for access to the desired electronic file is to be redirected. As depicted in the file repository storage module 304 of FIG. 7, the URL is http://<essiteURL>:1080/pictures. In this example, the portion of the path labeled <essiteURL> is the URL for the external storage site 320. Also, the URL includes a port number (1080) of the site 320 and a folder name (pictures). In other examples, an explicit port number or other information may not be used or specified.

In the example of FIG. 7, the file access module 310 (FIG. 3) may determine the location of the desired file (p.jpg) based on the location of the redirection file 702, the contents of the redirection file 702, and the location or path indicated in the original request 602. More specifically, the contents of the redirection file 702 (http://<essiteURL>:1080/pictures) indicate the URL and a starting point in. the external storage site 320 for the path by which the desired file (p.jpg) shall be found. Further, the location of the redirection file 702 (i.e., folder1), in conjunction with the expected location of the desired file to be accessed within the file repository storage module 304 (i.e., folder3), may describe a partial path from the location noted in the redirection file 702 to the desired file in the external storage site 320. More specifically, since the partial path segment from the location of the redirection file 702 to the expected file location in the file repository storage module 304 is folder2/folder3/p.jpg, the path segment, when added to the contents of the redirection file, yield a complete path for the desired file of http://<essiteURL>:1080/pictures/folder2/folder3/p.jpg.

In other examples not depicted in FIG. 7, the complete path for the desired file p.jpg may not be based on one or both of the location of the redirection file and the expected location of the desired file. p.jpg. In one example, ignoring the location of the redirection file 702 may result in a complete path for the desired file of http://<essiteURL>:1080/pictures/folder1/folder2/folder3/p.jpg or http://<essiteURL>:1080/pictures/folder3/p.jpg, depending on how the file access module 310 is configured to generate the complete path. In another embodiment, ignoring the expected location of the desired file may result in a complete path for the desired file of http://<essiteURL>:1080/pictures/p.jpg, http://<essiteURL>:1080/pictures/folder1/p.jpg, or http://<essiteURL>: 1080/pictures/folder1/folder2/p.jpg, again depending on how the file access module 310 is configured.

Returning to the specific example of FIG. 7, when the file access module 310 (FIG. 3) has generated the complete path for the desired file p.jpg, the file access module 310 may generate a separate HTTP GET request 704 specifying the complete path (i.e., http://<essiteURL>:1080/pictures/folder2/folder3/p.jpg). In response, the external storage site 320 may the retrieve the desired. file based on the complete path, and return the desired file p.jpg as the retrieved file 604 to the file repository 300, which may then return that same retrieved file 604 to the source of the original request 602.

In one embodiment, the redirection file 702 may be accessed directly via the file repository 300 by specifying the location or path of the redirection file 702 in the original request 602 to the file repository 300. In the examples of FIGS. 6 and 7, the location of the redirection file is http://<repoURL>/folder1/.redirectionURL. Such access to the redirection file 702 may facilitate modifications to the redirection file 702, and thus the resulting location of redirected files.

While the examples of FIGS. 6 and 7 involved read requests, other file access requests, such as requests to write or update a preexisting file, may be performed in a similar fashion. For example, an update file access request may involve an HTTP PUT request that includes a new version of the desired file, along with an indication of the expected location of the file in the file repository 300. In response, file access module 310 (FIG. 3) may determine that the file to be written or updated is located in the external storage site 320, and may cause the file to be updated appropriately using the redirection techniques discussed above.

As a result of at least some of the embodiments described above, a file repository abstraction layer may allow access to a file repository and multiple storage sites external to the file repository strictly through file access requests that target only the file repository. Such functionality, which may be provided by one or more redirection files stored in the file repository, may allow multiple file repositories in various application platforms to access a single copy of one or more electronic files of interest, as opposed to providing a separate copy of each file in each repository, thus reducing the overall data storage capacity employed to store the files. Additionally, the ability to use a single file across multiple locations may foster consistency and stability in application execution due to a reduced possibility of different versions of the same file. Further, this redirection functionality may be employed in a number of different file access operating modes, such as file system access, version control system access, and the like.

While the above discussion focuses on the use of a file repository abstraction layer in conjunction with enterprise applications and platforms, any device or system employing a file repository for access to a plurality of electronic files may benefit from application of the various principles described herein. For example, the techniques for providing a file repository abstraction layer, as discussed above, may be implemented in any general-purpose computing system employing a file repository, whether the repository is accessed via a wide-area network (WAN), such as the Internet, or accessed in a more local fashion.

Figure 8:
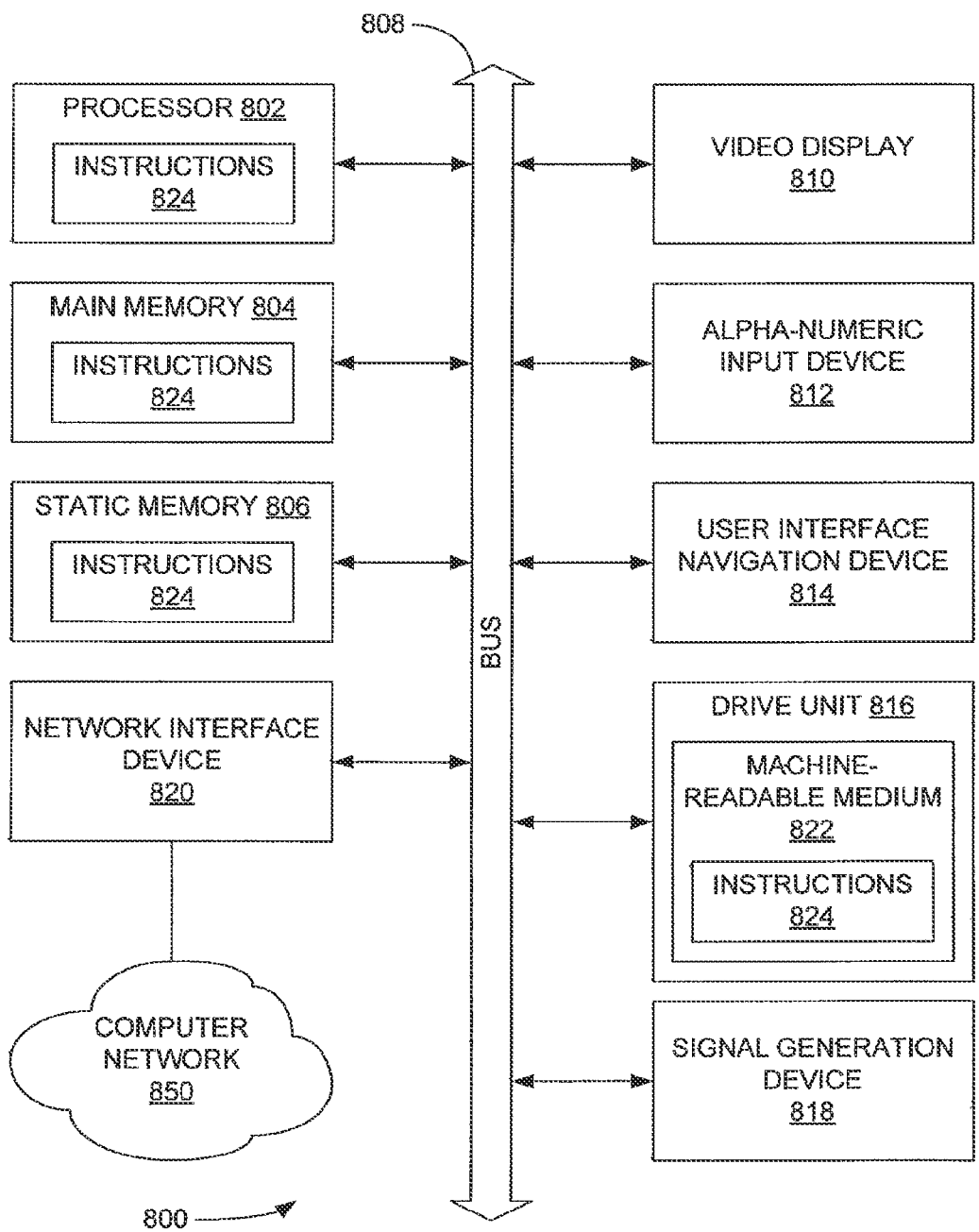
FIG. 8 depicts a block diagram of a machine in the example form of a processing system within which may be executed a set of instructions for causing the machine to perform any one or more of the methodologies discussed herein.

FIG. 8 depicts a block diagram of a machine in the example form of a processing system 800 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 800 includes a processor 802 (e.g., a central processing unit (CPU), a graphics processing unit (GPU), or both), a main memory 804 (e.g., random access memory), and static memory 806 (e.g., static random-access memory), which communicate with each other via bus 808. The processing system 800 may further include video display unit 810 (e.g., a plasma display, a liquid crystal display (LCD), or a cathode ray tube (CRT)). The processing system 800 also includes an alphanumeric input device 812 (e.g., a keyboard), a user interface (Up navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804, the static memory 806, and/or within the processor 802 during execution thereof by processing system 800, with the main memory 804 and processor 802 also constituting machine-readable, tangible media.

The data structures and instructions 824 may further be transmitted or received over a computer network 850 via network interface device 820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 800) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 802 or other programmable processor) that is temporarily configured by software to perform certain operations. It will be appreciated that the decision to implement a hardware module mechanically, in. dedicated and permanently configured circuitry, or in temporarily configured circuitry (for example, configured by software) may be driven by .cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 802 that is configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module. may then, at a later time, access the memory device to retrieve and process the stored output. Modules may also initiate communications with input or output devices, and can operate on a resource (for example, a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or inure processors 802 or processor-implemented modules. The performance of certain of the operations may be distributed among the one or more processors 802, not only residing within a single machine but deployed across a number of machines. In some example embodiments, the processors 802 may be located in a single location e.g., within a home environment, within an office environment, or as a server farm), while in other embodiments, the processors 802 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method, comprising:
   receiving from a requesting device an access request to retrieve an electronic file, the access request comprising an identification of a first storage location in a file repository;
   searching, using at least one processor of a machine, for the electronic file in the file repository at the first storage location in response to the access request;
   based on the searching for the electronic file being successful, retrieving the electronic file from the file repository at the first storage location;
   based on the searching for the electronic file being unsuccessful,
      accessing a redirection file in the file repository, the redirection file comprising an identification of a second storage location for the electronic file at a storage site external to the file repository, the accessing of the redirection file in file repository comprising searching for the redirection file in the file repository, beginning in a lowest-level electronic file folder containing the first storage location, and continuing to successively higher-level electronic file folders containing the first storage location, until the redirection file is discovered, and
      retrieving the electronic file from the storage site external to the file repository based on the identification of the second storage location; and
   transmitting the retrieved electronic file to the requesting device.

2. The method of claim 1, the retrieving of the electronic tile from the storage site external to the file repository being further based on a third storage location of the file repository at which the redirection file is accessed.

3. The method of claim 2, the retrieving of the electronic file from the storage site external to the file repository being further based on the first storage location.

4. The method of claim 1, the access request comprising a HyperText Transfer Protocol (HTTP) GET request.

5. The method of claim 1, the identification of the first storage location comprising a uniform resource locator.

6. The method of claim 1, further comprising:
   interpreting the access request according to an operating mode of a group comprising a file system mode and a version control system mode.

7. The method of claim 6, further comprising:
   receiving from a commanding device a command to set the operating mode; and
   storing an indication of the operating mode in a configuration file in response to the command.

8. The method of claim 1 further comprising:
   receiving from the requesting device a second access request to update the electronic file, the second access request comprising a revision of the electronic file and an identification of the first storage location in the file repository; and
   storing the revised electronic file at the storage site external to the repository based on the indication of the second storage location.

9. A non-transitory computer-readable storage medium comprising instructions that, when executed by at least one processor of a machine, cause the machine to perform operations comprising;
   receiving from a requesting device an access request to retrieve an electronic file, the access request comprising an identification of a first storage location in a file repository;
   searching for the electronic file in the file repository at the first storage location in response to the access request;
   based on the searching for the electronic file being successful, retrieving the electronic file from the file repository at the first storage location;
   based on the searching for the electronic file being unsuccessful,
      accessing a redirection file in the file repository, the redirection file comprising an identification of a second storage location for the electronic file at a storage she external to the file repository, the accessing of the redirection file in he file repository comprising searching for the redirection file in the file repository, beginning in a lowest-level electronic file folder containing the first storage location, and continuing to successively higher-level electronic file folders containing the first storage location, until the redirection file is discovered, and
      retrieving the electronic file from the storage site external to the file repository based on the identification of the second storage location; and transmitting the retrieved electronic file to the requesting device.

10. The non-transitory computer-readable storage medium of claim 9, the retrieving of the electronic file from the storage site external to the file repository being further based on a third storage location of the file repository at which the redirection file is accessed.

11. The non-transitory computer-readable storage medium of claim 10, the retrieving of the electronic file from the storage site external to the file repository being further based on the first storage location.

12. A system comprising:
   at least one hardware processor; and
   modules comprising instructions that are executable by the at least one hardware processor, the modules comprising:
      a file repository storage module to store a plurality of electronic files; and
      a file repository abstraction module to;
         receive from a requesting system an access request to retrieve an electronic file, the access request comprising an identification of a first storage location in the file repository storage module;

search for the electronic file at the first storage location in response to the access request;

based on the searching for the electronic file being successful, retrieve the electronic file from the file repository storage module at the first storage location;

based on the searching for the electronic file being unsuccessful, access a redirection file in the file repository storage module, the redirection file comprising an identification of a second storage location for the electronic file at a storage site external to the system, the accessing of the redirection file in the file repository searching for the redirection file in the file repository, beginning in a lowest-level electronic file folder containing the first storage location, and continuing to successively higher-level electronic file folders containing the first storage location, until the redirection file is discovered, and retrieve the electronic file from the storage site based on the identification of the second storage location; and transmit the retrieved electronic file to the requesting system.

13. The system of claim 12, the file repository abstraction module to retrieve the electronic file from the storage site further based on the first storage location.

14. The system of claim 13, the file repository abstraction module to retrieve the electronic file from the storage site further based on a third storage location of the file repository storage module at which the redirection file is accessed.

15. The system of claim 12, the file repository abstraction module further comprising:

a file system module to facilitate access to the file repository storage module according to a file system operating mode;

a version control system module to facilitate access to the file repository storage module according to a version control system operating mode; and a configuration module comprising an operating mode indication indicating one of the file system operating mode and the version control system operating mode;

the file repository abstraction module to select one of the tile system module and the version control system module to process the access request according to the operating mode indication.

16. The system of claim 12, the access request comprising a HyperText Transfer Protocol HTTP) GET request.

17. The system of claim 12, the identification of the first storage location comprising a uniform resource locator.

\* \* \* \* \*